United States Patent [19]

Mendenhall

[11] 4,179,147
[45] Dec. 18, 1979

[54] GOLF GREEN TOOL

[76] Inventor: Arthur L. Mendenhall, 4132 Gary Rd., Salt Lake City, Utah 84117

[21] Appl. No.: 910,488

[22] Filed: May 30, 1978

Related U.S. Application Data

[63] Continuation of Ser. No. 787,812, Apr. 15, 1977.

[51] Int. Cl.$^2$ ............................................. A01B 1/16
[52] U.S. Cl. .................................................. 294/50.7
[58] Field of Search .................... 294/50.7, 50.5, 50.8, 294/107, 115, 117; 172/371; 47/1

[56] References Cited

U.S. PATENT DOCUMENTS

| | | | |
|---|---|---|---|
| 1,885,377 | 11/1932 | Robinson | 294/50.7 |
| 3,567,264 | 3/1971 | Baber | 294/50.7 |

Primary Examiner—James B. Marbert
Attorney, Agent, or Firm—Charles E. Cates

[57] ABSTRACT

A tool for raising indentations in golf greens is provided. A shaft is telescopically carried within a sleeve that is provided with a longitudinal slot curving to one side to form a pocket. A pin carried by the shaft moves in the slot and the pocket. In use, the pin is retained in the pocket during a longitudinal thrust of the sleeve serving to implant the lower end of a plurality of fingers (pivotally attached to a base plate at one end of the shaft) vertically in the ground; then a rotation of the sleeve moves the pin from the pocket to the slot and the sleeve is telescoped onto the shaft by a longitudinal thrust, thereby forcing the upper ends of the fingers over a cam carried by the sleeve and converging the lower ends of the fingers toward the axis. The lower ends of the fingers do not touch, however, and are of different lengths. The fingers are automatically returned to a readiness position by gravity and the action of resilient means provided to urge the upper ends of the fingers together. The latter also maintains the fingers in a position of readiness for use. As a consequence the tool can be operated with one hand. The tool is effective on dry greens, presenting a smaller risk of severing the indentation from its surrounding area.

10 Claims, 5 Drawing Figures

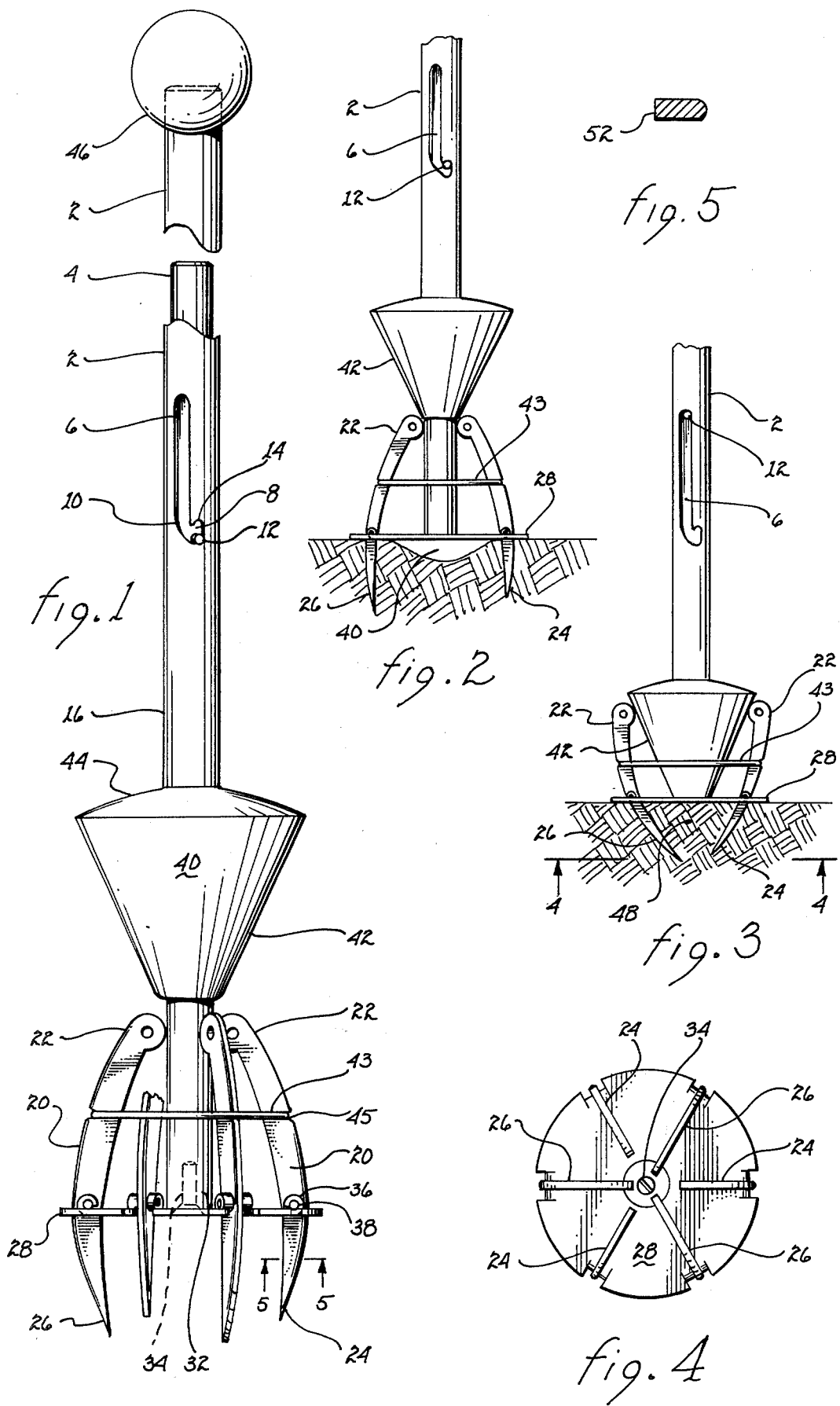

GOLF GREEN TOOL

This is a continuation of application Ser. No. 787,812, filed Apr. 15, 1977.

BACKGROUND

This invention relates to tools for maintaining golf course greens, particularly tools for repairing indentations therein created by driven golf balls as they hit the green with force.

The problem of repairing indentations in greens is serious in that such indentations affect the putting of the player adversely by diverting the course of the rolling ball. It generally falls the lot of the greenskeeper and his helpers to periodically repair such damage to prevent an accumulation which would make the greens unplayable. However, at times it is necessary for players to make on the spot repairs to fresh indentations that lie in the line of a putt to be made. These repairs are made with varying degrees of skill and success with implements at hand, golf tees for example. The task involves stooping and in the aggregate is time consuming and wearying for the greenskeeper. It, therefore, presents a need that many workers in the art have tried to meet, but with indifferent success. A frequent complaint against prior art devices is that they are too complicated and cumbersome, requiring two hands to operate. Others do not perform the assigned function satisfactorily. In any event the prior art tools soon fall into disuse because of their shortcomings. Finally, dry-natured greens found in many parts of the country pose a special problem. Repairs of indentations tend to separate a chunk of the green sub-surface from surrounding area instead of merely raising the affected part.

BRIEF SUMMARY OF THE INVENTION

A tool for raising green indentations is provided. The combination comprises a pair of relatively moveable telescoping members, a plurality of fingers fulcrumed in angularly spaced relation on means carried by the inner one of the members. The lower ends of the fingers, preferably of differing lengths, approach each other (but do not touch) in operating relationship. Means are also provided to maintain the lower ends of the fingers approximately parallel to the shaft and each other when the tool is in the state of readiness for use. There is further provided means defining a plane inclined from the axis of the members, the face of which plane bears on the upper end of the fingers to positively move them by relative movement of the telescoping members. Also provided are resiliently deformable means connecting the upper ends of said fingers which means urge the fingers radially inward. The outer member of the telescoping members has means defining a longitudinal slot which curves into and terminates in a pocket at the lower end of and offset to one side of the slot. A pin is carried by the inner member and is disposed to ride in the slot and follow into the pocket between uses. The pocket has means for preventing axial longitudinal movement of the pin; however, the pin may be released from the pocket by rotating the members relative each other in which case the pin may be positioned in and move in the slot. As a convenience, handle means may be provided at its upper end.

The operation is as follows: In the normal state of readiness for operation the pin is in the pocket. When the tool is thrust into the ground the fingers penetrate until stopped by the base plate. The pin is engaged by the upper wall of the pocket thus preventing any significant movement of the shaft relative the sleeve. Once the fingers are inserted into the ground the sleeve is rotated, thus moving the pin into the longitudinal slot. Further longitudinal thrusting of the sleeve moves the cone carried at the end of the sleeve against the upper ends of the fingers thus causing the lower ends of the fingers to move axially inward to lift the indentation. Afterwards when the sleeve is lifted the pin is automatically guided back into the pocket by gravity and the tool is reset to a state of readiness for instant use. The operation of the tool through many successive uses is accomplished standing up and with one hand, if it is desired to keep the other hand free for other functions.

DESCRIPTION OF THE PRESENTLY PREFERRED EMBODIMENTS

Turning now to the drawings in which a presently preferred embodiment of the invention is disclosed:

FIG. 1 is an elevation view of the device partly in section;

FIG. 2 is a partial view of the device of FIG. 1 showing the relationship of the elements of the tool during a first step in operation;

FIG. 3 is a partial view of the device of FIG. 1 showing the relationship of the elements in a second step of operation;

FIG. 4 is a view of the device of FIG. 3 along the lines 4—4 with the surrounding earth removed for ease of representation;

FIG. 5 is the device of FIG. 1 taken along the lines 5—5.

Referring now to FIG. 1, a tube or sleeve 2 telescopically receives a shaft 4. The sleeve 2 carries a longitudinally disposed slot 6 which at its bottom edge has a camming curve 10 which leads into a pocket 8. A pin 12 carried by the shaft 4 moves in the slot 6 and falls naturally into the pocket 8. This function will be explained presently. The lower end 32 of the shaft 4 is suitably tapped for reception of a screw 34 to secure the base plate 28 thereto. The base plate 28 has hinges 36 formed by rolling a portion of the periphery of the base plate inward to form a circle. Journalled in the hinges 36 are pins 38 attached to the fingers 20 intermediate their ends. The upper ends 22 of the fingers 20 bear on the shaft 4 when the tool is in the state of readiness for use. An "O" ring 43 urges the upper ends radially inward by reason of the fulcruming of the fingers at the hinges 36; consequently the lower ends of the fingers 24, 26 are maintained in a state of readiness in a position approximately parallel to the axis of the shaft 4. The "O" ring 43 is secured to the fingers 20 by means of slots 45 provided for that purpose.

At the lower end 16 of the sleeve 2 a cone 40 having a face which slants radially inward and downward presents an inclined plane to the upper ends 22 of the fingers 20. The bearing of the ends 22 on the face 42 provides a camming action urging the ends 22 radially outward in response to a longitudinal downward thrust of the sleeve 2 whereby the cone 40 telescopes on the shaft 4. Conversely, when pressure is removed, the "O" ring 43 urges the ends 22 radially inward and helps move the fingers and shaft back into a state of readiness for a new operation.

The materials of which the tool are made are not critical. Metal, wood or plastic can be employed for various parts. If a soft metal or plastic is employed for the sleeve, it would be desirable to reinforce the bearing surface of the roof 14 with an insert of tougher metal to prevent excessive wear. Manufacturing and assembly of the tool can be accomplished by standard, known techniques.

The cone 40 is attached to the lower end 16 of the sleeve 2 and this may be done in a number of ways, either by gluing or welding the two together, or by tapping the cone and providing mating threads in the sleeve. The cone, which may be made of a variety of materials, is suitably made of plastic, and may either be cast or milled as suits the convenience of the manufacturer. The pin 12 is, in this embodiment, force fit into an aperture drilled in the shaft to receive the pin. For convenience I have provided a handle 46, made of plastic, which is broached to receive a force fit of the upper end of the sleeve 2. The joinder may be secured by weatherproof glue. The manufacturing details mentioned herein, being matters of choice which persons skilled in the art can select in view of the teachings herein, are illustrative only and are not critical to the invention.

The operation of the device is as follows: In a normal state of readiness the pin resides in the pocket 8 as shown in FIG. 1 and in FIG. 2. The fingers 20 below the base plate 28 are in approximately parallel alignment to the shaft and to the sleeve and to each other. The first step of the operation is to thrust the fingers into the ground around an indentation 40 to be repaired. During the thrusting operation the pin 12 bears against the roof 14 of the pocket as shown in FIG. 2. The fingers remain in the parallel position as they enter the ground. This provides an advantage over certain other devices which begin to curve inwardly as soon as the fingers enter the ground. (Inasmuch as the object is to lift the underlying turf, it is advantageous to insert the fingers fully into the ground before the lifting operation is commenced.) When the fingers are fully inserted the downward thrust will automatically be arrested as the base plate 28 engages the ground surface. At this point the second step of the operation is commenced. The sleeve is rotated (in this embodiment in a counter clockwise position looking down) to release the pin 12 from the pocket 8 and move it into the longitudinal slot 6. The sleeve is then thrust down along its axis causing the face 42 of the cone 40 to bear against the upper end 22 of the fingers 20 and push them radially outward. Inasmuch as the fingers are fulcrumed at the hinges 36, the lower fingers 24, 26 are urged inwardly, lifting the sub-surface as shown in FIG. 3 against the flat face of the base plate 28. The downward thrust of the sleeve 2 is arrested at the proper time when the pin 12 has run its course in slot 6 as shown in FIG. 3.

At this point a second important feature of the invention may be appreciated. The lower ends 24, 26 of the fingers 20 are differing lengths. On greens that have dried somewhat around the indentation, care must be taken that the fingers do not sever the portion to be repaired from the surrounding green, thus creating a divot where formerly there was merely an indentation. I find that providing fingers of different length avoids the problem even in dry greens.

In cross-section the faces 52 of the fingers should be broad and flat, as best observed in FIG. 5. The object of the fingers is to lift—not to cut. For convenience of illustration the fingers as shown in FIG. 1 are somewhat narrower than might be optimum. However, the proper width of the face 52 may be determined without undue experimentation.

A valuable feature of the invention is the automatic return of the device to a state of readiness for a subsequent indentation repairing operation upon the removal of the fingers from the ground. The weight of the shaft and the fingers causes the shaft with the attached base plate and fingers to drop and the action of the curve 10 guides the pin 12 into the pocket 8, in which position the pin (and the whole tool) are in a state of readiness for another repair operation.

What is claimed is:

1. A tool for raising green indentations comprising, in combination, a pair of relatively moveable telescoping members; a handle carried by the outer one of said telescoping members; a plurality of fingers fulcrumed in angularly spaced relation on means carried by the inner one of said members, their lower ends approaching each other but not touching in operating relationship; means defining a plane inclined from the axis of said members bearing on the upper ends of said fingers to positively move said fingers by relative movement of said members; resiliently deformable means connecting the upper ends of said fingers and urging them radially inward; said outer telescoping member having means defining a longitudinal slot, a pocket offset to one side of said slot and at the lower end thereof, a pin carried by said inner member disposed to travel in said slot and to lodge in said pocket; said pocket having means for preventing significant axial movement of said pin such that rotation of the members relative each other is required to move said pin from said pocket into said slot.

2. The tool of claim 1 wherein said means carried by the inner one of said members is a base plate.

3. The tool of claim 1 wherein said fingers are of differing lengths.

4. The tool of claim 1 wherein said telescoping members comprise a shaft and an outer sleeve.

5. The tool of claim 4 wherein said sleeve has handle means at its upper end.

6. The tool of claim 1 wherein said means defining a plane is a cone.

7. The tool of claim 1 wherein said resiliently deformable means is an "O" ring.

8. The tool of claim 1 wherein said means for preventing significant axial movement comprises a dome-shaped roof to said pocket.

9. The tool of claim 1 wherein said longitudinal slot and said pocket are connected by means defining a curved surface and said pin carried by said inner member is disposed to travel in said slot and in said curved surface and to lodge in said pocket under the influence of gravity.

10. A tool for raising green indentations comprising in combination, a pair of relatively moveable telescoping members; a plurality of fingers of differing ground-penetrating length fulcrumed in angularly spaced relation on means carried by the inner one of said members, their lower ends approaching each other but not touching in operating relationship; means defining a plane inclined from the axis of said members bearing on the upper ends of said fingers to positively move said fingers by relative movement of said members; resiliently deformable means connecting the upper ends of said fingers and urging them radially inward.

* * * * *